United States Patent [19]

Hovens et al.

[11] Patent Number: 4,473,220
[45] Date of Patent: Sep. 25, 1984

[54] COPYING MACHINE WITH STAPLE REMOVING AND COLLECTING APPLIANCE

[75] Inventors: Johannes F. J. E. Hovens, Venlo; Hendrikus J. J. van Soest, Helden-dorp, both of Netherlands

[73] Assignee: Océ-Nederland B.V., Venlo, Netherlands

[21] Appl. No.: 528,392

[22] Filed: Sep. 1, 1983

[30] Foreign Application Priority Data

Sep. 13, 1982 [NL] Netherlands ..................... 8203543

[51] Int. Cl.$^3$ .......................... B42B 1/02; B25C 11/00
[52] U.S. Cl. ........................................ 270/53; 254/28
[58] Field of Search ............... 270/53; 254/28; 227/63

[56] References Cited

U.S. PATENT DOCUMENTS

| | | | |
|---|---|---|---|
| 1,160,568 | 11/1915 | Bottle ..................................... | 254/28 |
| 3,056,584 | 10/1962 | Pankonin ........................... | 227/63 X |
| 3,625,482 | 12/1971 | Viel ....................................... | 254/28 |
| 3,672,635 | 6/1972 | Munson et al. ..................... | 227/63 |
| 4,281,445 | 8/1981 | Barber et al. ....................... | 254/28 X |

FOREIGN PATENT DOCUMENTS 22364 1/1981 European Pat. Off. .
47597 1/1972 Japan ..................................... 254/28

OTHER PUBLICATIONS

"Stapler Unloader For Copier", IBM Technical Disclosure Bulletin, vol. 18, No. 9, 2/76, p. 2807.

*Primary Examiner*—E. H. Eickholt
*Attorney, Agent, or Firm*—Albert C. Johnston

[57] ABSTRACT

A top panel of a copying machine is provided with a tray or like means forming a cavity recessed from bordering top surface areas for collecting staples removed from stapled bundles of originals to be copied, and a rigid finger protrudes freely into the cavity for removing the staple from a bundle of originals suitably placed onto and moved over the appliance. The finger has its top surface largely formed flat and tapered to an upturned narrowed tip that projects slightly above the plane of the adjacent top surface areas. By placing a stapled bundle of sheets on the appliance with the staple located ahead of the finger and the bent-over legs of the staple facing upward and then manually moving the bundle over the finger, the tip of the finger can engage between the staple and the sheets, and upon further movement of the bundle the tapered forward portion of the finger pulls the staple out of the sheets.

13 Claims, 3 Drawing Figures

COPYING MACHINE WITH STAPLE REMOVING AND COLLECTING APPLIANCE

This invention relates to a copying machine equipped with an appliance for removing and collecting staples from sheets fastened together in bundles by the staples.

Originals to be copied by a copying machine often are in the form of a bundle or set of sheets connected together by a fastener. The copying machine operator has to remove the fastener before feeding the originals into the machine one by one. An area of a top panel of the copying machine generally is used as a working surface for the fastener removing operations. This surface sometimes is formed with a cavity at a location readily accessible to the machine operator for receiving removed fasteners and retaining them in a magnetic field.

When the fasteners to be removed are relatively large, as in the case, for example, of paper clips, the machine operator can readily take hold of them and place them in the cavity. On the other hand, when the fasteners are small, as is common in the case of staples, a hand-held device ordinarily is used for removing them. In such case a staple or a piece broken from one may readily elude the operator, and considerable risk exists that this foreign object may reach the interior of the copying machine, for instance, by being entrained by an original sliding over the working surface. Such an occurence may result in malfunctioning of and even in serious damage to the copying machine.

The principal object of the present invention is to provide the copying machine with an appliance for reliably removing, collecting and retaining the staples from stapled bundles of originals to be copied, so that the risk of malfunction or damage in the machine from loose staples or pieces of them may be reduced or avoided; also, so that little or no need may exist for use of a hand-held staple remover at the working surface of the copying machine.

To achieve this purpose, according to the invention, an outer panel such as a top panel of a copying machine is provided, within convenient arm's reach of an operator of the machine, with an appliance that comprises means forming a cavity for collecting staples removed from stapled bundles of sheets, the cavity being bordered by and recessed from substantially flat top surface areas that lie in a common plane such as the plane of the panel surface, and a substantially rigid finger protrudes freely into the cavity and is formed so that the finger will engage with and remove the staple of a stapled bundle of sheets suitably placed onto and moved over the appliance. The finger has its top surface largely formed flat and smooth and disposed in the same plane as the top surface areas that border the cavity, and a forward portion of the finger is tapered to a narrowed upturned tip that projects slightly above the said plane so as to keep the tip readily engageable between the staple and the sheets of such a bundle.

This appliance enables the staple connecting originals in a bundle to be removed by a simple manual movement of the bundle over the finger with the bent-over legs of the staple facing upward. During this movement, the upturned tip of the finger engages under the base of the staple and the finger then pulls the staple away from the bundle while bending open the legs of the staple. The removal takes place in and over the cavity recessed from the bordering top surface areas so that the staple when released from the finger will drop into the cavity and be retained in it. The risk of a staple or part of one moving uncontrollably so as to reach the interior of the copying machine is thus practically avoided.

Other objects, features and advantages of the invention will be apparent from the following detailed description and the accompanying drawings of a copying machine equipped with a staple removing and collecting appliance according to a preferred embodiment of the invention. In the drawings.

Figure 1:
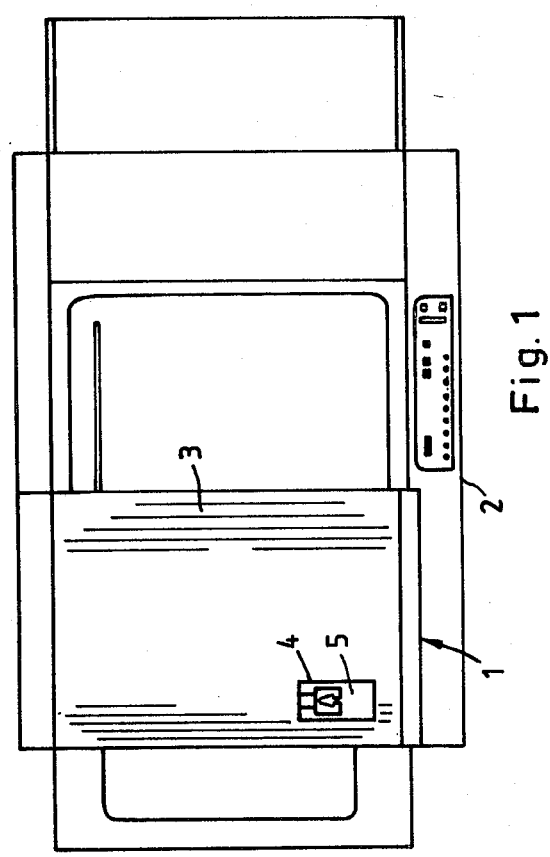
FIG. 1 is a top plan view of such a copying machine.

The copying machine as shown in FIG. 1 comprises a movable cover 1 which, when in closed position, covers the platen provided for exposing the originals to be copied. The cover 1 has a flat panel 3 in which an opening 4 is formed at a location within easy arm's reach of an operator standing at the front side 2 of the copying machine, and a staple removing and collecting appliance 5 made according to the present invention is fitted in the opening 4.

Figure 2:
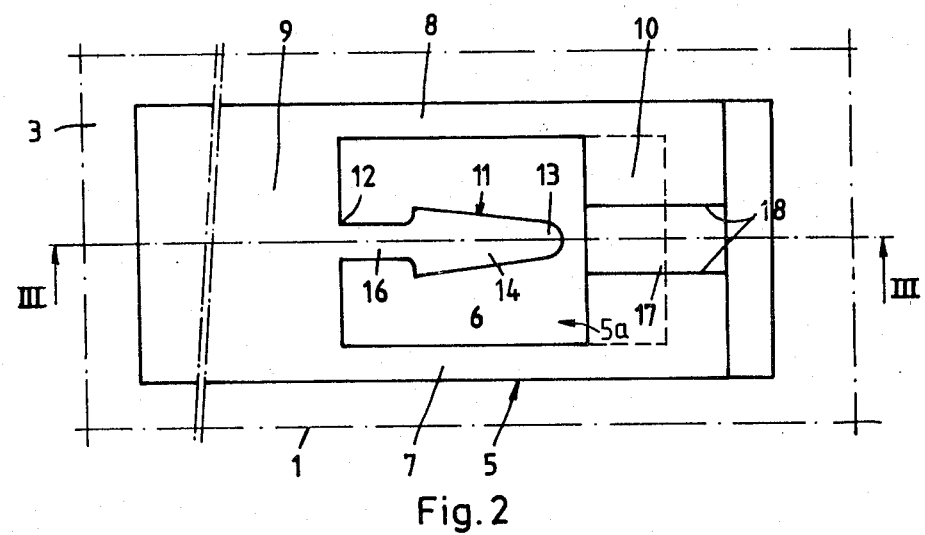
FIG. 2 is a plan view of the appliance mounted in a portion of a top panel of the copying machine.
Figure 3:
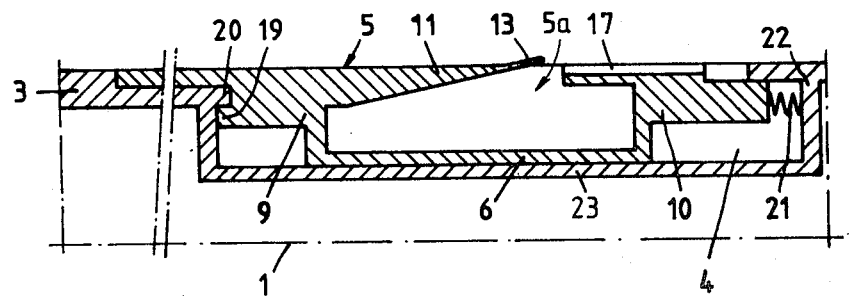
FIG. 3 is a cross sectional view taken along the line III—III in FIG. 2.

The appliance 5 is made generally in the form of a tray the walls of which delimit a staple collecting cavity 5a having a staple removing rigid finger 11 protruding into it, as shown more particularly in FIG. 2 and FIG. 3. The cavity 5a is bordered by a bottom wall 6 and four side walls 7, 8, 9 and 10 which have upright portions connected to wall 6 and adjoining one another at right angles and have top portions presenting smooth, flat top surface areas that lie in a common plane flush with the adjacent top surface of the panel 3.

The finger 11 is connected at its backward end 12 to wall portion 9 of the tray 5, and extends freely forward in the upper portion of cavity 5a at a location equidistant from the parallel tray side wall portions 7 and 8. The finger 11 is made with a smooth, flat top surface largely located in the same plane as the top surface areas of the tray walls 7, 8, 9 and 10. A forward portion 14 of the freely protruding finger 11 tapers to a narrowed upturned tip 13 that projects slightly, for example, to a distance of 1–2 mm at its end, above the plane of the top surface areas of the tray walls and the panel 3. This upturned tip, for instance, has a thickness of 0.7 mm and is located at a distance of a few millimeters from the adjacent top portion of the tray side wall 10.

Considered in the longitudinal direction away from its tip 13, the finger 11 comprises the relatively long tapered forward portion 14 which gradually increases in both width and thickness up to a location where it is joined with a backward portion 16 having a width substantially less than the maximum width of the forward portion 14. For instance, the width of the forward portion 14 increases to about 10–11 mm, e.g., to 10.5 mm, while its thickness increases from about 0.7 mm at the narrowed tip 13 to about 6 mm at the junction with portion 16. The backward portion 16, for example, has a thickness of 6 mm and a width of 6 mm.

The smooth top surface areas of wall portions 9 and 10 of the tray 5 are relatively long in the direction of the length of the finger 11. A groove 17 is recessed in the top surface of wall 10 located ahead of the finger tip 13 and is aligned longitudinally with the finger 11, for receiving and guiding onto the finger tip a staple of a stapled bundle of sheets suitably placed onto and moved over the tray 5. The groove 17 has side walls 18 so located that projections of these walls are contiguous to the widest portion of the finger 11. Thus, for example, the groove 17 also has a width of about 10.5 mm.

The tray 5 preferably is fitted into the opening 4 in the top panel 3 of the copying machine so that the top surface areas of the tray lie flush with the adjacent top surface of the panel 3, although they may project somewhat above it, and so that the narrowed upturned tip 13 of the finger 11 is directed away from an operator standing at the front side 2 of the copying machine. The tray is mounted displaceably in the top panel opening so as to be easily removable for emptying collected staples, and then replaceable in working position. For this purpose, for example, one end of the tray 5 may be formed with a recess bordered by a flange 19 to receive an edge portion 20 of the opening in top panel 3, and the opposite end of the tray may be pressed by a compression spring 21 located between the tray end and an end wall 22 of the panel opening. Thus, the tray 5 can be removed simply by sliding it along a supporting base wall 23 of the panel against the force of the compression spring 21 and then lifting it out of the panel opening. The reverse movements serve for replacing the tray.

We claim:

1. A staple removing and collecting appliance of a copying machine, comprising means forming in a top panel of such machine at a location within arm's reach of a machine operator a cavity for collecting staples removed from stapled bundles of sheets, said cavity being bordered by and recessed from substantially flat top surface areas that lie in a common plane, and a substantially rigid finger protruding freely into said cavity for removing staples from such bundles, the top surface of said finger largely being flat and disposed in substantially the same plane as said top surface areas, said finger comprising a forward portion tapering to a narrowed upturned tip that projects slightly above said plane so as to be engageable between a staple and the sheets of a stapled bundle suitably placed onto and moved over the appliance.

2. An appliance according to claim 1, said forward portion of said finger increasing gradually in width in the longitudinal direction thereof away from said tip, and being joined with a backward portion of said finger the width of which is less than the maximum width of said forward portion.

3. An appliance according to claim 2, said forward portion of said finger increasing gradually also in thickness from its said tip to its junction with said backward portion.

4. An appliance according to claim 1, said cavity forming means comprising a wall element a top surface area of which lies substantially in said plane at a location ahead of said tip and has a groove recessed therein and aligned longitudinally with said finger for receiving and guiding onto said tip a staple of a said stapled bundle of sheets.

5. An appliance according to claim 4, at least one side wall of said groove being located so that a projection thereof is contiguous to the widest portion of said finger.

6. An appliance according to claim 1, said cavity forming means comprising a unitary member in the form of a tray of which a side wall portion has said finger fixed thereto and projecting freely therefrom in an upper region of said cavity, said tray being mounted displaceably so as to be removable and replaceable in an opening provided for it in said top panel.

7. An appliance according to claim 5, said cavity forming means comprising a unitary member in the form of a tray of which a side wall portion has said finger fixed thereto and projecting freely therefrom in an upper region of said cavity, said tray being mounted displaceably so as to be removable and replaceable in an opening provided for it in said top panel.

8. An appliance for removing and collecting staples from stapled bundles of sheets, comprising wall means forming a cavity for collecting staples removed from such bundles, said wall means presenting about said cavity substantially flat top surface areas that lie in a common plane, and a substantially rigid finger protruding freely into said cavity with the top surface of said finger also being largely flat and disposed in the same plane as said surface areas, said finger comprising a forward portion tapering to a narrowed upturned tip that projects slightly above said plane so as to be engageable between a staple and the sheets of a said bundle when the bundle is suitably placed onto and moved over said top surface areas.

9. An appliance according to claim 8, said tip projecting about 1–2 mm above said plane and being of about 0.7 mm in thickness and being spaced a few millimeters away from a said top surface area ahead of said finger.

10. An appliance according to claim 8, said forward portion of said finger increasing gradually in width and in thickness in the longitudinal direction thereof away from said tip, and being joined with a backward portion of said finger the width of which is substantially less than the maximum width of said forward portion.

11. An appliance according to claim 9, said forward portion of said finger increasing gradually in width and in thickness in the longitudinal direction thereof away from said tip, and being joined with a backward portion of said finger the width of which is substantially less than the maximum width of said forward portion.

12. An appliance according to claim 11, said maximum width being of about 10–11 mm, the width of said backward portion being of about 6 mm, and said thickness being of about 6 mm at the junction of said portions.

13. An appliance according to claim 11, one of said surface areas being spaced ahead of said tip and having a groove recessed therein and aligned longitudinally with said finger for receiving and guiding onto said tip a staple of a said bundle.

* * * * *